UNITED STATES PATENT OFFICE.

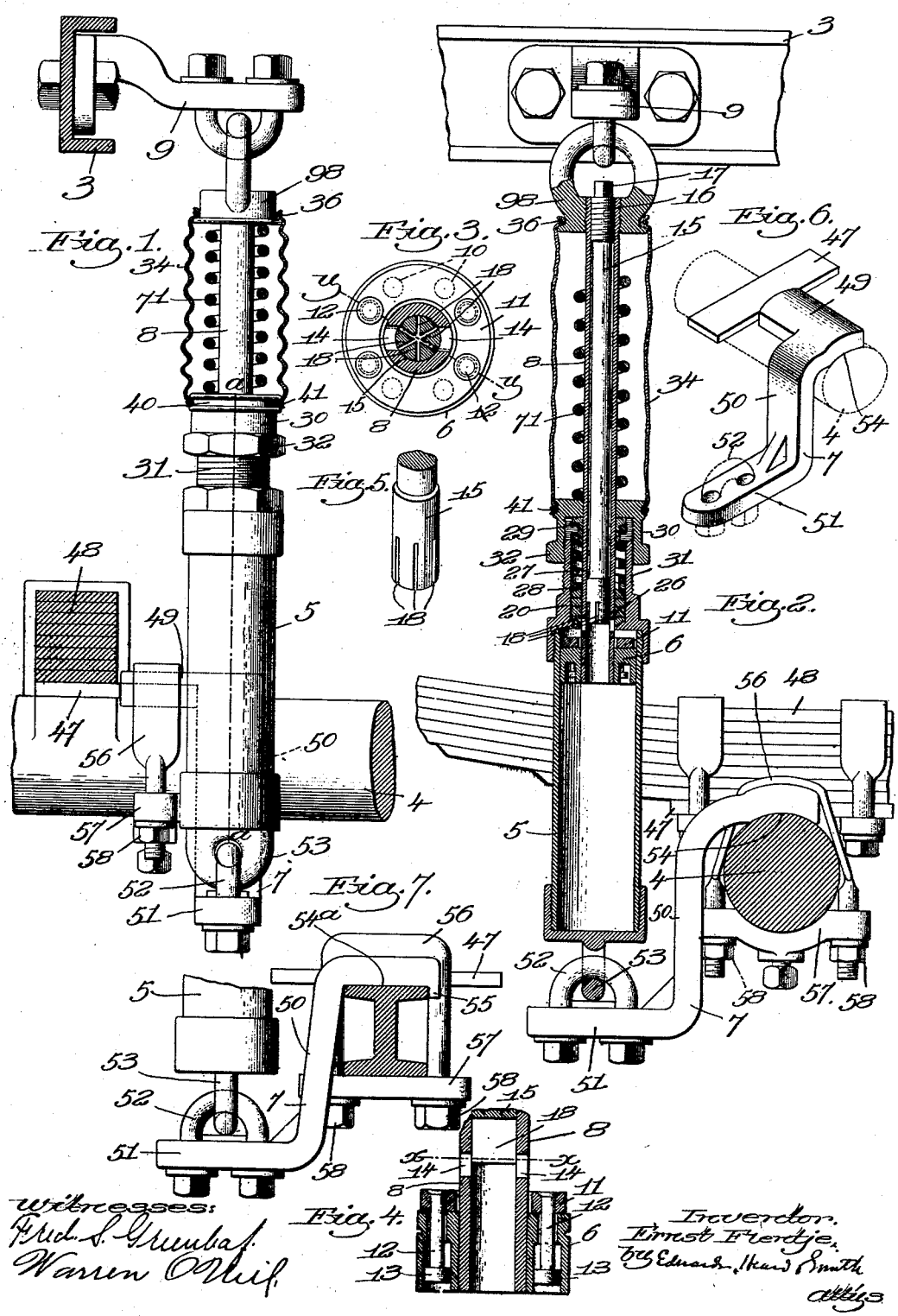

ERNST FLENTJE, OF CAMBRIDGE, MASSACHUSETTS.

SHOCK-ABSORBER.

1,045,136.  Specification of Letters Patent.  Patented Nov. 26, 1912.

Application filed October 12, 1911. Serial No. 654,230.

*To all whom it may concern:*

Be it known that I, ERNST FLENTJE, a citizen of the United States, residing at Cambridge, county of Middlesex, and State of Massachusetts, have invented an Improvement in Shock-Absorbers, of which the following description, in connection with the accompanying drawing, is a specification, like characters on the drawing representing like parts.

This invention relates to shock absorbers for automobiles and similar vehicles and is in the nature of an improvement on the device shown in my Patent No. 899,662, dated September 29, 1908. The device shown in said patent comprises a cylinder connected to the axle of the automobile and adapted to contain liquid and a piston connected to the frame of the automobile and operating in said cylinder, said piston having ports therein which are controlled by valves arranged so as to permit the piston to move freely in the cylinder while the automobile spring is being compressed but to prevent the rapid recoil movement of the spring.

Some automobile springs require a greater resistance to properly check the recoil thereof than other springs do. Moreover, when an automobile is heavily loaded a less resistance is required in the shock absorber to give an easy riding movement than when the automobile carries comparatively little load. In my present invention I have provided for varying the resistance to the movement of the piston in the cylinder whereby the shock absorber can be readily adjusted to the requirements of use. I have also otherwise improved shock absorbers, all as will be more fully hereinafter described and then pointed out in the appended claim.

Referring to the drawings wherein I have shown one embodiment of my invention, Figure 1 is a sectional view of my improved shock absorber taken in a vertical plane parallel with the axis of the automobile; Fig. 2 is a sectional view taken in a plane at right angles to that of Fig. 1 with the shock absorber shown in section on the line $a$—$a$, Fig. 1; Fig. 3 is a sectional view on the line $x$—$x$, Fig. 4; Fig. 4 is a section on the line $y$—$y$, Fig. 3; Fig. 5 is a fragmentary perspective view of the lower end of the valve in the piston rod; Fig. 6 is a perspective view of the hanger connected to the axle; Fig. 7 shows a slightly different form of hanger from that shown in Figs. 2 and 6.

In the drawings I have shown only sufficient parts of an automobile to illustrate the manner in which the shock absorber is used because the operation of shock absorbers of this nature is well known to those skilled in the art.

3 designates a portion of the side sill of an automobile body and 4 indicates the axle.

5 designates the cylinder of the shock absorber which is adapted to contain glycerin or some other suitable liquid and 6 is a piston operating in the cylinder. The cylinder is connected to the axle 4 by means of a hanger 7. The piston 6 is provided with a hollow piston rod 8 which is connected to a hanger 9 that is secured in some usual manner to the side sill 3 of the car. The hanger 7 is of special design and comprises a head portion 47 which is adapted to fit on the spring seat of the axle beneath the spring 48, an arm 49 which extends laterally from this head portion and overlies the axle 4, and the portion 50 which extends laterally and downwardly from the arm 49 and terminates in a foot 51 carrying the staple 52 which is connected to the eye 53 on the bottom of the cylinder. The arm 49 is shaped on its lower side to fit the upper face of the axle. Where the axle is round, as shown in Fig. 2, the under side of the arm 49 will be formed with the curved seat 54 to fit the curvature of the axle, but if the axle is of the shape shown in Fig. 7, then the seat portion 54ª will have a corresponding shape and the arm will be preferably provided with the lip 55 to engage the side of the axle. A clip 56 embraces the arm 49 and the ends of the arms of the clip pass through a clamping member 57 and are provided with clamping nuts 58. Said clip and clamping member serve to clamp the arm 49 to the axle and the manner in which the arm fits the axle serves to prevent any lateral movement of the arm and hanger. The piston 6 is provided with ports 10 that are adapted to be closed by a valve 11 shown in the form of an annular ring. This valve has secured thereto studs 12 which pass down through apertures in the piston and are provided on their under sides with heads 13 that engage the piston when the valve is open and serve to limit the opening movement thereof.

When the automobile springs are compressed the piston descends and the valve 11 opens automatically as far as the studs 12 will permit, thus allowing the liquid to pass from the lower to the upper side of the piston. The bore of the piston rod 8 is open to the cylinder beneath the piston, and said piston rod is provided with the ports 14 which communicate with the cylinder above the piston. When the automobile spring recoils and the piston moves upwardly, the valve 11 closes and liquid will be transferred from the upper to the lower side of the piston through the ports 14, the size of which determines the speed of movement of the piston. Situated within the piston is a valve 15 in the form of a rod which is adapted to control the size of the ports 14 and the upper end 16 of which projects beyond the hanger 9 and is provided with the squared end 17 for the reception of a wrench or similar tool. This valve is screw-threaded to the interior of the piston rod so that it can be screwed longitudinally of said piston rod. The lower end of the valve is provided with the slits 18, as clearly seen in Figs. 3 and 5. By properly adjusting the valve 15 the size of the ports 14 can be controlled and these ports may be uncovered more or less depending upon the requirements of use. The slits 18 are for the purpose of preventing the valve 15 from being adjusted so as to entirely close the ports 14. These slits are of such a length that when the valve 15 is screwed down into the piston rod as far as possible thereby carrying the lower end of the valve below the ports 14, said slits will still communicate with the ports and will furnish a small continuously-open passage through which the liquid can pass. If, therefore, by accident or otherwise the valve is screwed into the piston rod too far the device will still be operative, for an open passage will be left for the transfer of liquid.

It sometimes happens that an automobile spring will have a violent recoil during which the piston is drawn up to the top of the cylinder. To avoid the danger of the piston striking the top of the cylinder during such violent recoil, I propose to so place the ports 14 that they will be drawn into the stuffing box 20 before the piston reaches the upper limit of its movement, as shown in Fig. 2. It will thus be seen that if there is a violent recoil and the piston moves clear to the upper end of the cylinder the ports 14 will be closed by entering the stuffing box before the piston strikes the cylinder head and the liquid which is trapped in the upper end of the cylinder will prevent the contact of the piston head with the cylinder. I have also shown a shield or cover 34 which surrounds the piston rod and extends from the stuffing box to the head 98 at the end of the piston rod and which serves to prevent any dust from being drawn into the stuffing box by the movement of the piston. This shield or cover is in the nature of a flexible tube which is connected at its upper end to the head 98 by means of a wire 36 and at its lower end is connected to the stuffing box. The stuffing box is of that type in which the packing is acted upon by a spring and means are provided for adjusting the spring pressure as wear occurs. The packing is shown at 26 and it is acted upon by a spring 27, the lower coil of which is beveled, as at 28, to engage the packing. The upper end of the spring abuts against a follower 29 slidably mounted on the piston rod and the follower is held in place by a cap 30 that screw-threads to the neck 31 of the piston head. As the packing wears, any leakage can be prevented by tightening up the cap 30 and thereby increasing the pressure of the spring. The shield 34 is connected to the cap 30 and in order to provide for turning said cap without disconnecting the shield 34 therefrom I have made said cap with the hexagonal portion 32 above which is a groove 40 adapted to receive a binding wire 41 that ties the lower end of the shield 34 to the cap. With this construction the hexagonal portion of the cap is always exposed so that it can be tightened up whenever required and a swivel connection is provided between the cap and the shield 34.

71 designates a spring surrounding the piston rod within the cover 34 and which serves both to prevent the cover from engaging said rod and also to cushion the downward movement of the piston.

I do not claim herein the manner of securing the leather covering 34 to the cap nut 30, nor the particular type of hanger shown, but I reserve the right to claim these features in divisional applications.

Having fully described my invention, what I claim as new and desire to secure by Letters Patent is:—

In a shock absorber having a cylinder to contain liquid, a ported piston therein, and a valve for closing said ports, the combination with a hollow piston rod connected to the piston and open to the cylinder below the piston, said piston rod having ports communicating with the cylinder above the piston, of a valve within the piston rod for controlling said latter ports, said valve having transverse slits therein and provided with a stem which projects beyond the piston rod and is screw-threaded thereto, said slits being of a length to be in communication with the ports in the piston rod when the valve is adjusted into its extreme lower position.

In testimony whereof, I have signed my name to this specification, in the presence of two subscribing witnesses.

ERNST FLENTJE.

Witnesses:
 LOUIS C. SMITH,
 THOMAS J. DRUMMOND.

Copies of this patent may be obtained for five cents each, by addressing the "Commissioner of Patents, Washington, D. C."